E. M. COLE.
PLANTER.
APPLICATION FILED JAN. 29, 1908.
908,549.
Patented Jan. 5, 1909.
2 SHEETS—SHEET 1.
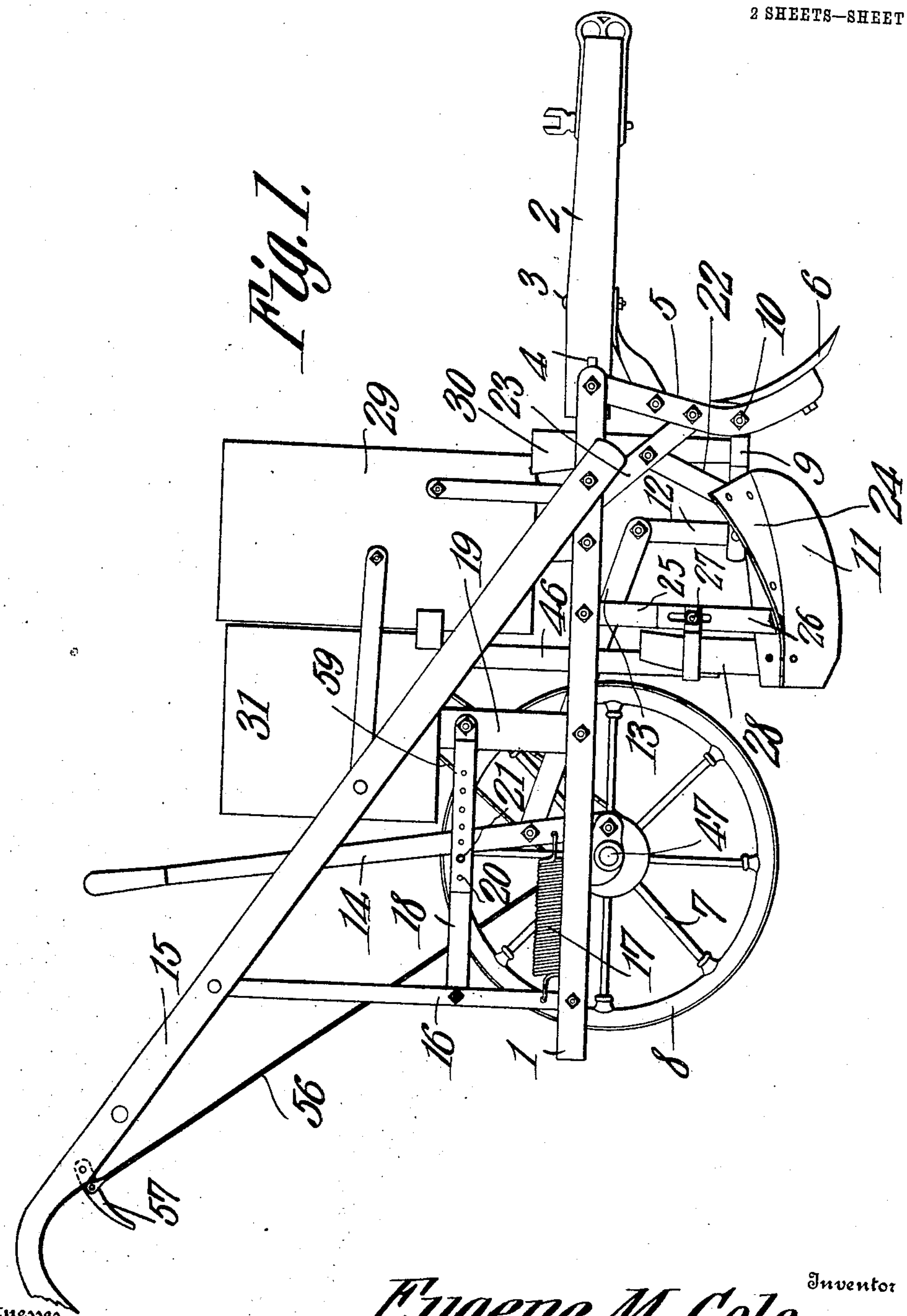
Witnesses
E. J. Stewart
E. Daniels
Inventor
Eugene M. Cole.
By C. A. Snow & Co
Attorneys.

E. M. COLE.
PLANTER.
APPLICATION FILED JAN. 29, 1908.
908,549. Patented Jan. 5, 1909.
2 SHEETS—SHEET 2.
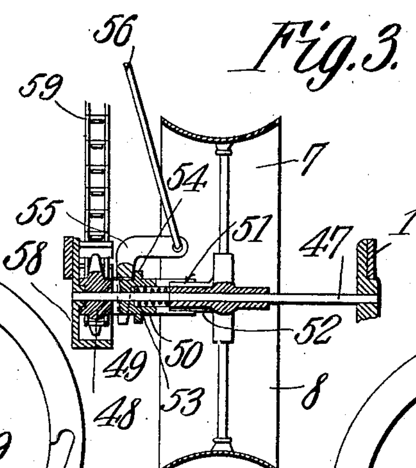
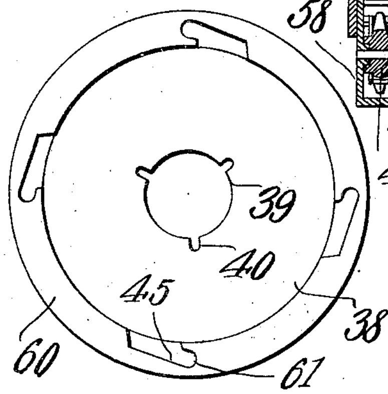
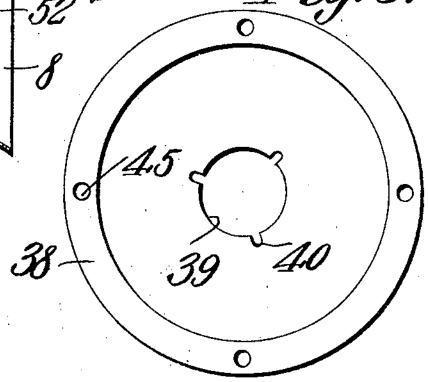
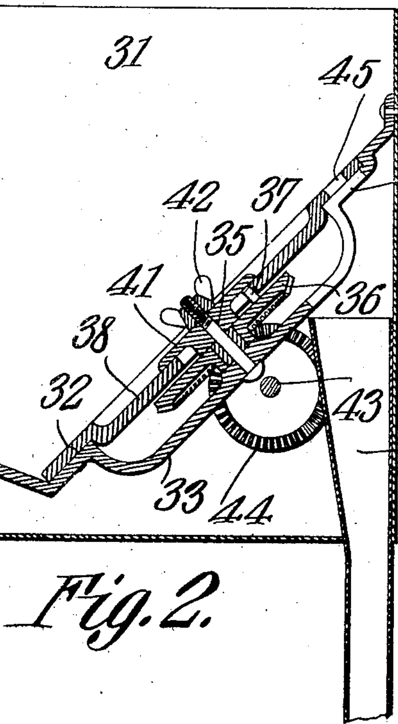
Fig.6.
38
7
61
7
45
39
40
60
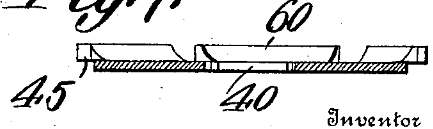
Witnesses
E. J. Stewart
C. Daniels
Inventor
Eugene M. Cole.
By C. A. Snow & Co
Attorney.

UNITED STATES PATENT OFFICE.

EUGENE MACON COLE, OF CHARLOTTE, NORTH CAROLINA.

REISSUED

PLANTER.

No. 908,549. Specification of Letters Patent. Patented Jan. 5, 1909.

Application filed January 29, 1908. Serial No. 413,224.

*To all whom it may concern:*

Be it known that I, EUGENE M. COLE, a citizen of the United States, residing at Charlotte, in the county of Mecklenburg and State of North Carolina, have invented a new and useful Planter, of which the following is a specification.

This invention has relation to planters and it consists in the novel construction and arrangement of its parts as hereinafter shown and described.

The object of the invention is to provide a seed box with a seed separating and dropping mechanism which may be readily converted to operate upon different characters of seed and which effectually performs its function by separating a single seed from the bulk contained within the box and elevating the seed thus separated and dropping the same from an elevated point within the seed box thereby avoiding the use of brushes or scrapers for keeping back the bulk of seed, and dispensing with the friction incidental to the use of such attachments.

In the accompanying drawing: Figure 1 is a side elevation of the planter. Fig. 2 is a vertical sectional view of the seed box. Fig. 3 is a transverse sectional view through a covering wheel used upon the planter. Figs. 4, 5 and 6 are plan views of different forms of seed separating plates which may be used in the planter, and Fig. 7 is a transverse sectional view of the form of plate shown in Fig. 6 cut on the line 7, 7 thereof.

The planter consists of the frame 1 to the forward end of which is mounted the draft beam 2. Said beam is pivoted upon the bolt 3 and is provided at its rear end portion with a slot 4 which receives the forward portion of the frame 1. Consequently the said beam may have a limited horizontal swing but is retained against relative vertical movement. By so mounting the draft beam the implement may be more readily maintained in a straight line should the draft animals fail to keep in such a line and the implement may be readily turned at the end of a row and at the same time a compact arrangement of parts is effected.

The standard 5 depends from the forward portion of the frame 1 and the plow point 6 is mounted upon said standard. The rear portion of the frame 1 is supported by the cover wheel 7 which is provided with a broad concaved rim 8. The arm 9 is pivotally connected to the bolt 10 with the standard 5 and the vertically disposed blade or furrow opener 11 is fixed to the rear portion of the said arm 9. The vertically disposed arm 12 is also fixed to the blade 11 and the link 13 pivotally connects the upper end of the arm 12 with the lever 14 which is suitably fulcrumed upon the frame 1. The handles 15 are attached at their lower ends to the frame 1 and the braces 16 are mounted upon the frame 1 and connect at their upper ends with the handles 15. The coil spring 17 is connected at its forward end to the lever 14 and at its rear end to one of the braces 16 and is under tension with a tendency to hold the said lever toward the brace. The guide 18 is supported at one end by the upright 19 mounted upon the frame 1 and at its other end by the brace 16. The lever 14 passes vertically through the said guide. The said guide is provided with a series of perforations 20 any one of which may receive a pin 21 for limiting the rearward swing or movement of the lever 14.

The hangers 22 depend from the brace 23 which is interposed between the frame 1 and the standard 5. The lateral blades 24 are rigidly supported at the lower ends of the hangers 22 and are so formed as to lie in inclined positions at their forward ends and substantially horizontal positions at their rear end. The said lateral blades lie upon opposite sides of the blade 11 with their inner edges in close contact with the vertical sides of the same. The hangers 25 support the rear portions of the lateral blades 24 and the blade 11 is provided with an upstanding tongue or lug 26 which lies between the hangers 25 and is connected with the same by means of the bolt and slot connection 27. The fender 28 is mounted upon the rear end of the blade 11.

From the above description it is obvious that as the implement is drawn along the ground the plow point 6 will open a furrow and the blade 11 will cut an incision in the bottom of the said furrow in which the seed is deposited as will be hereinafter explained. At the same time the lateral blades 24 move along the surface of the soil and regulate the depth at which the blade 11 will cut therein. Should the blade 11 encounter an obstruction, such as a rock or root, the said blade will move vertically and ride over the same without subjecting the parts of the implement to the force of impact with the said obstruction. The said blade may move vertically by reason of the fact that the arm 9 is pivotally connected with the standard 5 at the point 10. While the movement of the blade 11 is substantially vertical it is in fact in the path of an arc and as the arm 12 moves with the said blade the link 13 is moved longitudinally and the lever 14 is swung in a forward direction against the tension of the spring 17. Consequently, as soon as the blade 11 passes over an obstruction it is acted upon by the tension of the spring 17 and again returned to its normal position below the lateral blades 24. As the said lateral blades 24 are stationary and their inner edges are in close contact with the sides of the blade 11 they have a tendency to keep the blade 11 clean and free of accumulated material as the same moves between the said runners.

The fertilizer hopper 29 is mounted upon the frame 1 and the fertilizer chute 30 extends from the bottom of the said hopper to a point behind the plow 6. Any suitable means or mechanism may be employed within the hopper 29 for forcing or passing the material into the chute 30. The seed box 31 is mounted upon the uprights 19 and is located just behind the hopper 29. The seed box 31 is provided with an inclined bottom 32 which is provided at its middle with a concavity 33 and at its upper portion with a seed outlet opening 34. The spindle 35 is located at the center of the concavity 33 and is disposed at a right angle to the plane of the bottom 32. The beveled gear wheel 36 is journaled for rotation upon the spindle 35 and is provided upon its upper side with pins 37. The seed separating and dropping plate 38 is provided with a central opening 39 which receives the spindle 35 and which is provided at its edge with the recesses 40 for the reception of the pins 37. The washer 41 is located upon the spindle 35 and is held thereon by means of the wing nut 42. The intermediate portion of said washer passes through the opening 39 of the plate 38 and bears against the side of the wheel 36 while the edge portion of the said washer bears upon the upper surface of the plate 38 and holds the same in position upon the pins 37. The shaft 43 is journaled for rotation under the bottom 32 and the beveled pinion 44 is fixed to the shaft 43 and passes through an orifice in the portion 33 of the bottom 32 and meshes with the gear wheel 36. The plate 38 is provided at or near its periphery with an upstruck or raised annular portion having the seed orifices 45 and the lower ends of these orifices are preferably flush or in the same plane with the upper surface of the plate. The upper end of the tube or chute 46 is located under the seed outlet 34 in the bottom 32 and the lower end of said chute is located in the fender 28.

The shaft 43 is rotated as will be hereinafter explained and such movement is transmitted through the pinion 44 and wheel 36 to the plate 38. As the said plate 38 rotates within the seed box 31 its lower portion is below the bulk of seed carried within the said box and as the seed openings 45 are successively elevated to the upper portion of the bottom 32 they each receive and carry up a single seed and when the said openings come into register with the outlet 34 in the bottom 32 the seed falls from the opening 45 through the outlet 34 into the tube 46 from whence it passes behind the fender 28 into the incision made in the soil by the blade 11. When the seed is thus deposited in the furrow it is covered by the earth pressed down by the concaved periphery 8 of the wheel 7. In as much as the openings in the plate 38 separate the seed from the bulk thereof contained within the box 31 and elevate the separated seed above the bulk before passing the same out of the box any superfluous seeds which may attempt to lodge in an opening 45 which already contains a seed are acted upon by gravity at various points during their upward movements and slide back over the plate 38 and into the bulk of seed as the opening 45 approaches the highest point in its course. Thus, the seeds are separated without the use of brushes or scrapers which attachments add undue and objectionable friction to the proper operation of the mechanism. Moreover, as the seeds are not carried between unyielding faces but are held within the openings solely by their own weight there is no danger of wedging and thus crushing or otherwise injuring them.

The wheel 7 is mounted upon the axle 47 and the sprocket wheel 48 is loosely mounted upon the said axle. Said sprocket wheel is provided at its hub with a clutch member 49. The clutch member 50 is slidably mounted upon the hub of the wheel 7 and is provided with elongated slots 51 which receive the lugs or splines 52 carried by the hub of the wheel 7. The outer end of the member 50 is adapted to engage and disengage the clutch member 49. The coil spring 53 is housed within the member 50 and bears at one end against the end of the hub of the wheel 7 and at its other end against the member 50. The said spring is under tension with a tendency to hold the clutch member 50 in engagement with the clutch member 49. The member 50 is provided upon its periphery with an annular flange 54 and the yoke 55 straddles the member 50 and is adapted to bear laterally against the flange 54 for shifting the member 50 longitudinally against the tension of the spring 53. The rod 56 connects the yoke 55 with a lever 57 fulcrumed to one of the handles 15. Thus, an operator may by swinging the lever 57 move the rod 56 longitudinally which in turn will swing the yoke 55 and move the member 50 against the tension of the spring 53 thus separating the clutch members and permitting the wheel 7 to rotate without rotating the sprocket wheel 48. The said sprocket wheel 48 is located in a housing 58 and the sprocket chain 59 passes around the sprocket wheel 48 and a similar sprocket wheel mounted upon the end of the shaft 43.

In the form of plate as shown in Fig. 5 the seed openings 45 are circular and are designed to receive smooth seed, such as peas or beans. In the form of plate as shown in Fig. 4 the seed openings 45 are elongated and provided at their ends with recesses 61. This form of plate is especially adapted to be used for separating corn or oblanceolate kernels. The portion 60 at the periphery of the plate is of a thickness substantially equal to that of the transverse thickness of the average grain of corn and the recesses 61 receive the kernels with their sides approximately lying in the same planes as the sides of the portion 60 of the plate.

In the form of the plate as shown in Figs. 6 and 7 the recesses 45 are located at the periphery of the plate. This form of plate is provided with a thickened portion 60 at its periphery and the openings 45 are provided with recesses 61. The portion 60, however, is in breadth substantially equal to the breadth of the kernels of corn and the recesses 61 receive the kernels and hold the same so that their edges substantially occupy the same planes as those occupied by the opposite sides of the portion 60. In other words, in the form of the plate as shown in Fig. 4 the seed is received sidewise and retained edgewise while in the form as shown in Figs. 6 and 7 the seed is received edgewise and retained sidewise. The latter form of plate retains the seed more securely against the vibration and jarring of the implement in that the seed will have to move a greater distance before its center of gravity can arrive at a point beyond the sides of the portion 60 of the said plate.

Having described my invention, what I claim as new and desire to secure by Letters Patent is:

1. In a planter a seed box having an outlet, and a separating device revoluble in the box for selecting and conveying seeds to the outlet and having one face entirely exposed, said device being mounted to discharge surplus seeds from the selected seeds by gravity over any portion of said exposed face prior to reaching the outlet.

2. In a planter a seed box having an outlet, and an inclined separating device revoluble in the box for selecting seeds and elevating them to the outlet, said device having one face fully exposed and being disposed to discharge the surplus seeds from the selected seeds by gravity over any portion of the exposed face of said device prior to the discharge of said selected seeds into the outlet.

3. In a planter a seed box having an outlet, an inclined disk therein having its upper face fully exposed and provided with seed receiving openings extending through the disk, said openings being disposed to discharge surplus seeds by gravity over the disk at any point thereon prior to reaching the outlet.

4. In a planter a seed box having an inclined bottom provided with an outlet, and a plate revolubly mounted upon said bottom and having its upper face fully exposed, said face having a seed opening extending therethrough, said opening being disposed to discharge surplus seeds by gravity over the plate at any point thereon prior to reaching the outlet.

5. In a planter a seed box having an inclined bottom provided with an outlet, an inclined plate revolubly mounted upon the bottom and having a seed opening extending therethrough, the upper face of said plate being fully exposed and flush with the bottom end of the opening, said opening being disposed to discharge surplus seeds by gravity over the plate at any point thereon prior to reaching the outlet.

6. In a planter a seed box having an outlet and an inclined plate revolubly mounted within the box and having a seed opening extending therethrough, the upper face of said plate being fully exposed flush with the bottom end of the opening, said opening being disposed to discharge surplus seeds by gravity over the face of the plate at any point thereon and prior to reaching the outlet.

7. In a planter a seed box having an inclined bottom provided with an outlet, and an inclined plate revolubly mounted upon said bottom, said plate having a seed opening constantly uncovered and disposed to discharge surplus seeds by gravity over the plate at any point thereon before reaching the outlet, the bottom of said box being shaped to direct seeds into the opening.

8. In a planter a seed box having an outlet, an inclined plate revolubly mounted within the box and having an upstanding marginal portion, there being a seed opening within said portion disposed to discharge surplus seeds by gravity prior to reaching the outlet, the bottom end of said opening being flush or in the same plane with the upper face of the plate.

9. In a planter a seed box having an outlet, an inclined plate revolubly mounted within the box and having an upstanding marginal portion, there being a seed opening within said portion constantly open at the top and one side and normally closed at the bottom, said opening being disposed to discharge surplus seeds by gravity and over the face of the plate at any point thereon to the bottom of the box prior to reaching the outlet.

10. In a planter a seed box having an inclined bottom and an outlet, an inclined plate revolubly mounted upon the bottom and having an upstanding marginal portion, there being a seed opening within said portion constantly open at the top and one side and normally closed at the bottom, said opening being disposed to discharge surplus seeds onto the face of the plate at any point thereon before reaching the outlet, said plate being detachably connected to the driving mechanism.

11. In a planter a circular seed dropping plate having an upstanding marginal portion, the bottom face of said marginal portion being in substantially the same plane as the top face of the plate, said marginal portion having seed receiving openings therein and extending therethrough, each opening having that wall thereof nearest the center of the plate partly removed to constitute a discarding opening.

12. In a planter the combination with a seed box having an inclined bottom provided with an outlet, said bottom having a concaved middle portion; of a drive gear extending into said concaved portion, a toothed wheel revolubly mounted within the concaved portion and meshing with the gear, upstanding projections upon the wheel, a plate bearing upon the wheel and loosely engaging the projections, said plate being slightly shiftable radially in all directions relatively to the projections and bearing upon the bottom of the seed box, there being a seed opening within the plate to convey a seed to the outlet and to discharge surplus seeds by gravity prior to reaching the outlet.

In testimony that I claim the foregoing as my own, I have hereto affixed my signature in the presence of two witnesses.

EUGENE MACON COLE.

Witnesses:
H. FLYNN WOLFE,
MARION J. GREEN.